Feb. 8, 1938.　　　F. M. ARCHIBALD　　　2,107,265
PROCESS OF PURIFYING ALCOHOLS BY REMOVING THE OILY IMPURITIES
Filed Nov. 20, 1934
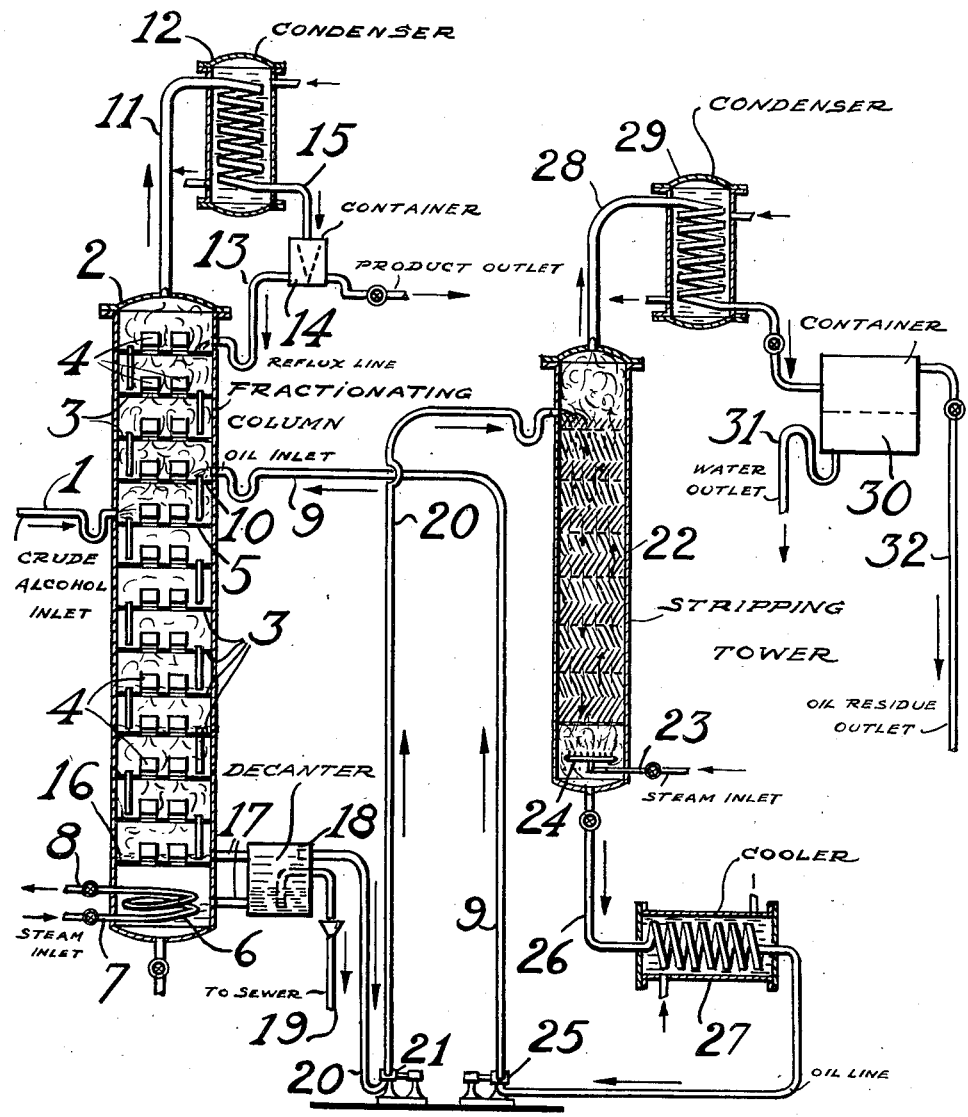
Francis M. Archibald Inventor
By W. E. Currie Attorney Patented Feb. 8, 1938

2,107,265

UNITED STATES PATENT OFFICE 2,107,265

PROCESS OF PURIFYING ALCOHOLS BY REMOVING THE OILY IMPURITIES

Francis M. Archibald, Elizabeth, N. J., assignor to Standard Alcohol Co.

Application November 20, 1934, Serial No. 753,807

4 Claims. (Cl. 202—67)

The invention relates to a process of purifying alcohols and relates particularly to the removal of oily impurities, especially the oily impurities that boil in the same range as the alcohols.

When alcohols are first produced by a process in which unsaturated hydrocarbons, such as ethylene, propylene, and the like, are combined with sulfuric acid, the esters hydrolyzed by means of water and alcohols distilled off, they usually carry persistent odors foreign to the alcohols proper. The nature of the impurities varies and is not always known. In the case of secondary and tertiary alcohols produced from unsaturated compounds, there are present, besides olefines, ethers and higher alcohols as well as sulfur compounds of unknown structure. In Patent No. 1,712,475 issued May 7, 1929, to H. E. Buc, a process of purifying alcohols is described in which the alcohol is diluted with water, agitated a number of times with different portions of a highly refined petroleum oil, the oil separated after each agitation and finally the separated alcohol distilled.

This invention relates to improvements in the process of purification of alcohol disclosed in the above patent. In the process referred to above, the alcohols are diluted before treating with highly refined petroleum oils; no dilution is required in this process with the following redistillation to reconcentrate the alcohols. By this invention the hot vapors of alcohols may be taken directly from the still where they have been produced and purified before condensing.

The accompanying drawing illustrates an apparatus that is appropriate for the practice of this process, although the successful application of the process is not dependent on using this exact apparatus.

Alcohol, prepared by the absorption of an olefine in sulfuric acid, followed by hydrolysis and distillation, is passed through pipe 1 into a fractionating column 2 provided with plates 3 having bubble caps 4. It is preferred to pass the alcohol onto the fifth plate 5 from the top, though it may be passed onto other plates of the fractionating column 2. A steam coil 6 with inlet 7 and outlet 8 is provided in the lower portion of the fractionating column 2, supplying heat to vaporize and keep the alcohol in the form of a vapor in the upper portion of the fractionating column. Highly refined, odorless petroleum oil of about 570° to 580° F. initial boiling point and having a Saybolt viscosity of around 205 to 215 seconds at 100° F. is passed through pipe 9 onto the fourth plate 10 from the top of the fractionating column 2. The petroleum oil may be passed onto any plate which is above the plate on which the crude alcohol is introduced, though most effective results were obtained by passing onto the fourth plate. The vapors of the alcohol passing upwardly through the fractionating column 2 are brought into contact with the liquid petroleum oil passing downwardly in countercurrent to the alcohol vapors and thereby the alcohols are freed of any oil-soluble impurities. The vapors are passed from the fractionating column 2 through pipe 11 and condensed in condenser 12. Pipe 13 is provided for returning a reflux of liquid alcohol from the container 14 into which the condensed alcohol is emptied from condenser 12 through pipe 15 to regulate the temperature in the upper part of the fractionating column 2.

Any liquid accumulating in the lower part of fractionating column 2 is removed both from above the lower plate 16 and from the lower part of fractionating column 2 through pipes 17 to decanter 18. In decanter 18 the liquid separates into two layers: an aqueous layer which is discarded through pipe 19 to the sewer and an oil layer. The oil layer is passed through pipe 20 by means of pump 21 to an upper part of stripping column 22. Stripping column 22 may be provided with plates and bubble caps or may be a packed tower. Steam is provided to the lower part of the stripping column 22 in the form of a spray through pipe 23 and spray nozzle 24.

The steam passing upwardly in countercurrent relation to the petroleum oil passing downwardly removes all the lower boiling compounds. The petroleum oil stripped of its lower boiling compounds is passed by means of pump 25 through pipe 26 and cooler 27 to pipe 9 and fractionating column 2. The steam with the lower boiling oily compounds passes through pipe 28 through condenser 29 to container 30. In the container 30 the lower boiling oily compounds and steam, both condensed to liquid oil and water, separate into layers. The water layer is removed through pipe 31 to the sewer and the oil layer is removed through pipe 32 to be used as fuel.

The highly refined, substantially odorless petroleum oil may be used continuously in this process with very little addition of oil. The alcohol is purified in one step without dilution and a number of distillations.

It is not intended that the invention be limited to the certain specific embodiments shown but in the appended claims it is intended to claim all inherent novelty in the invention as broadly as the prior art permits.

I claim:

1. In a process of purifying alcohols derived from unsaturated hydrocarbons and containing oily impurities in solution by removing the oily impurities, the improvement which comprises passing vapors of an alcohol containing oily impurities in countercurrent flow with a liquid highly refined petroleum oil, separating the vapors of the alcohol from the liquid petroleum oil and condensing the vapors of the alcohol separately.

2. In a process of purifying alcohols derived from unsaturated hydrocarbons and containing oily impurities in solution by removing the oily impurities, the improvement which comprises passing vapors of an alcohol containing oily impurities in countercurrent flow with a liquid colorless, odorless petroleum oil of about 570° to 580° F. initial boiling point and having a Saybolt viscosity of around 205 to 215 seconds at 100° F., separating the vapor of the alcohol from the liquid petroleum oil and separately condensing the alcohol vapors after contacting with said petroleum oil.

3. In a process of purifying alcohols derived from unsaturated hydrocarbons and containing oily impurities in solution by removing the oily impurities, the improvement which comprises passing the vapors of an alcohol containing oily impurities in countercurrent flow with a liquid highly refined petroleum oil, separating the alcohol vapors and the liquid highly refined petroleum oil, condensing the alcohol vapors and subjecting the liquid highly refined petroleum oil to heat to vaporize the impurities removed from the alcohol.

4. In a process according to claim 3 in which the liquid highly refined petroleum oil is used again in the process after freeing of impurities removed from the alcohol.

FRANCIS M. ARCHIBALD.